Dec. 22, 1959  A. M. LIPPISCH  2,918,229
DUCTED AIRCRAFT WITH FORE ELEVATORS
Filed April 22, 1957  4 Sheets-Sheet 1

INVENTOR.
ALEXANDER M. LIPPISCH
BY
*Marvin Moody*
ATTORNEY

Dec. 22, 1959  A. M. LIPPISCH  2,918,229
DUCTED AIRCRAFT WITH FORE ELEVATORS
Filed April 22, 1957  4 Sheets-Sheet 2
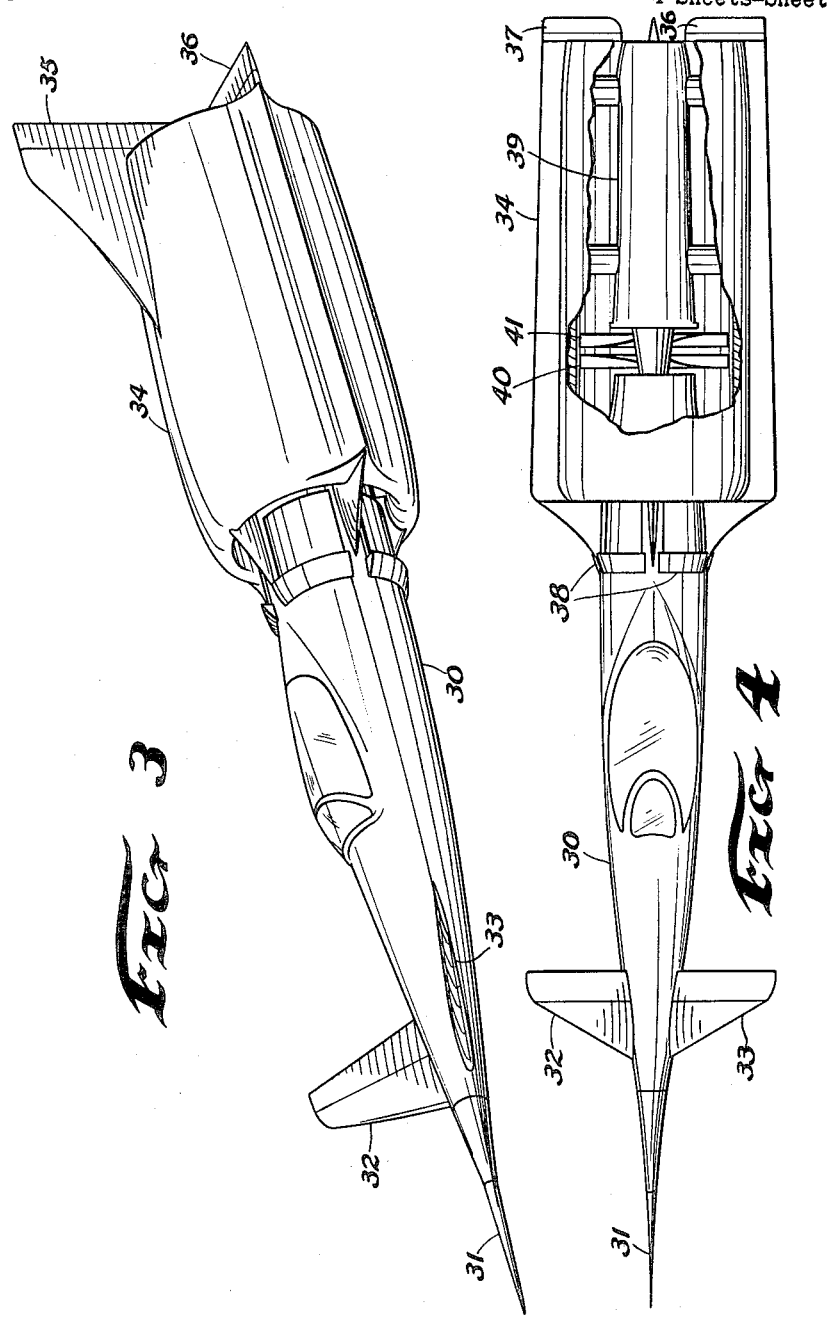
INVENTOR.
ALEXANDER M. LIPPISCH
BY
ATTORNEY

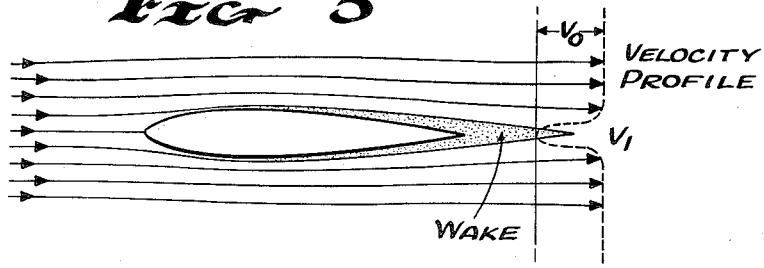
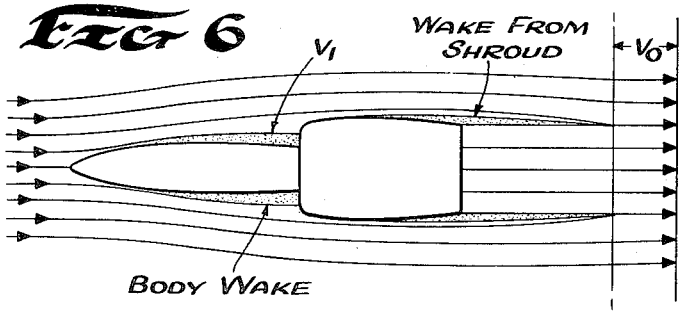
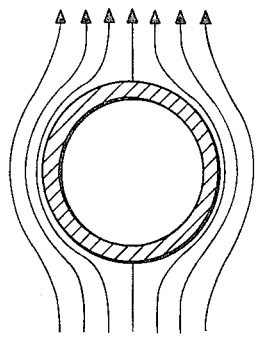
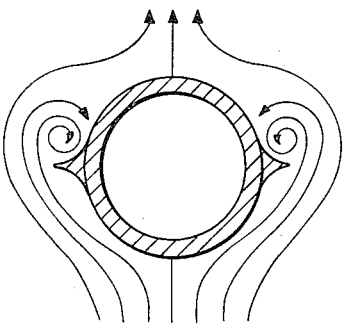

Dec. 22, 1959  A. M. LIPPISCH  2,918,229
DUCTED AIRCRAFT WITH FORE ELEVATORS
Filed April 22, 1957  4 Sheets-Sheet 4

INVENTOR.
ALEXANDER M. LIPPISCH
BY
ATTORNEY

# 2,918,229

DUCTED AIRCRAFT WITH FORE ELEVATORS

Alexander M. Lippisch, Cedar Rapids, Iowa, assignor to Collins Radio Company, Cedar Rapids, Iowa, a corporation of Iowa Application April 22, 1957, Serial No. 654,417

2 Claims. (Cl. 244—15)

This invention is related to ducted propeller aircraft and pertains particularly to aircraft having an aft air duct for propulsion and fore elevators for controlling pitch.

An aircraft according to this invention utilizes a single aft air duct for thrust and for main lift and has fore elevators to provide lift which is required for pitch control. In previously designed aircraft having shrouded propellers, multiple air ducts have been incorporated to supply all lift so that fixed air foils are not required. One of the advantages of such aircraft or aerodynes is that they have sufficient lift to enable them to hover or fly vertically without translational motion. Moreover, they are capable of greater forward speed than is normally possible with helicopters which have commonly been used for hovering flight. Also, propelling mechanisms are simple compared with those required for helicopters. The aircraft described herein are still simpler in construction, may be constructed at relatively low cost, and utilize the high efficiency of the ducted propulsive systems. Although they are not adapted to take off vertically and to hover, they can take off on a short runway and climb nearly vertically immediately after take-off. Because of their high efficiency, nearly vertical ascent can be attained with prevalent power loading of 2 pounds to 5 pounds per horsepower.

An object of the present invention is to combine in an aircraft a shrouded propulsive system and elevators to provide economical operation and to provide control characteristics that are similar to those of the conventional wing aircraft.

Another object is to provide longitudinal fins along the sides of the aircraft to provide lift that results from vortices caused by upward circulation of air over the fins.

Another object is to provide in ducted aircraft a propulsive system and control system that permit the aircraft to take off or land on a short runway.

Another object is to provide an aircraft wherein the air flow system is arranged for minimum drag so that high speed may be obtained with minimum power.

And still another object is to provide an aircraft of the type that utilizes an air duct for increased efficiency and that can be manufactured at low cost.

A feature of the aircraft is the incorporation of an adjustable shock ring about the fuselage ahead of the intake for the aft air duct.

Other features will become apparent upon reading the description with reference to the accompanying drawings in which:

Figure 3 is an oblique view of another embodiment of the invention that has been modified for high speed flight;

Figure 4 is a top view of the aircraft of Figure 3 which has a cutaway portion for showing installation of a turbojet power system;

Figure 5 is a diagram of air flow to show the velocity profile of a conventional aircraft wing;

Figure 6 is a diagram of air flow to show the velocity profile of an aircraft according to this invention;

Figure 7 is a diagram of air flow to show upward air flow about a cylindrical object or fuselage;

Figure 8 is a diagram of air flow to show the upward flow of air about a fuselage to which longitudinal fins have been added;

Figure 1:
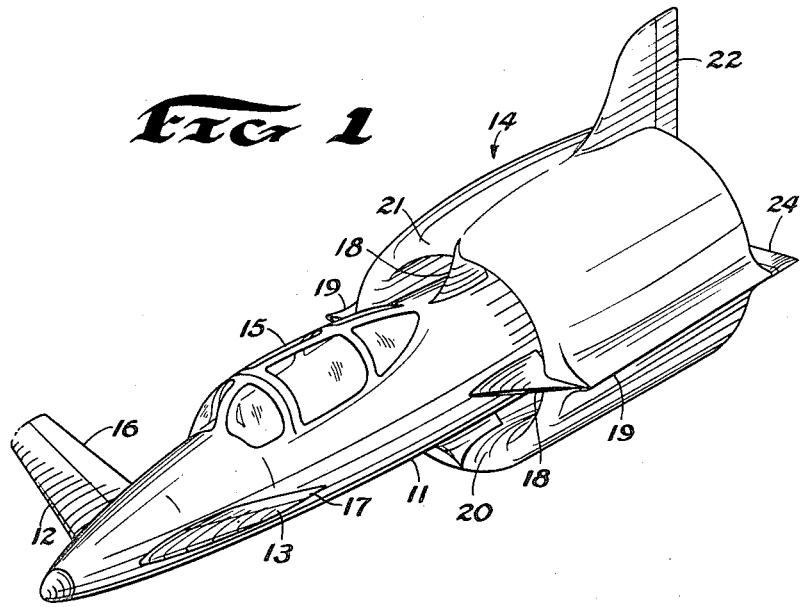
Figure 1 is an oblique view of the aircraft of this invention.

The aircraft of Figure 1 comprises streamlined fuselage 11 having a pair of fore elevators 12—13 and a shroud 14 that surrounds the aft portion of the aircraft. A cockpit and passenger space 15 is located directly ahead of shroud 14. For stability, the center of gravity of the aircraft is in front of the shroud. The fore elevators 12—13 have adjustable air surfaces 16 and 17 respectively that may be controlled individually from the cockpit. Preferably, in order to obtain a high degree of stability, the elevator airfoils 12—13 have a large dihedral angle. The shroud 14 is coaxially positioned about the aft portion of the fuselage by equally spaced streamlined supports 18. The shroud, which is generally cylindrical in shape, has a stubby fin or ridge extending longitudinally along each of its sides. Although the upper and lower portions of the shroud may be of uniform cross-section, to obtain more lift the upper and lower portions are preferably shaped according to conventional practice for airfoils. For example, the lower portion 20 of shroud 14 may have a relatively straight external wall but have a cambered internal wall. The profile of the wall, progressing from the bottom portion of the shroud 14 to the upper portion 21, changes gradually so that the inner wall of the upper portion is substantially straight while the external wall of the shroud is cambered for producing maximum lift.

Figure 2:
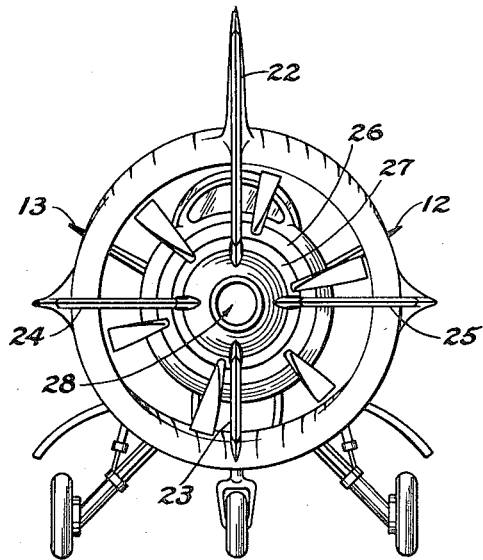
Figure 2 is a rear view of the aircraft of Figure 1.

A rear rudder consisting of control surfaces 22 and 23 of Figure 2 is disposed vertically in the rear opening of the air duct. In addition to the fore elevators, rear elevators having control surfaces 24 and 25 are disposed horizontally in the rear opening. These surfaces may be controlled individually by conventional means for changing the pitch or the roll of the aircraft. The air propulsive system includes counter-rotating propellers 26 and 27 which are driven by a gas turbine. An exhaust jet stream from the engine is expelled rearwardly from the central exhaust opening 28. The landing gear, shown in Figure 2, is of conventional design.

The embodiments shown in Figures 3 and 4 incorporate design features suitable for supersonic flight. The elongated streamlined fuselage 30 has a pointed nose 31 and a rear air duct 34. The air has sufficient length for enclosing a turbojet by-pass engine. The fore elevators 32 and 33 have a large dihedral angle for stability and may have a large degree of sweepback. This embodiment also has a rudder 35 and aft elevator control surfaces 36 and 37 similar to those described for Figure 2. An adjustable shock ring 38 which encircles the fuselage ahead of the intake of the air duct provides an oblique conical shock wave that compresses the air that enters the air duct. As the velocity of the aircraft is gradually increased above Mach 1, the shock ring may be moved forward by controllable gear means within the fuselage in order to direct the shock wave into the intake. Motor 39 that is mounted within air duct 34 may be a by-pass turbojet with counter-rotating propellers 40 and 41.

Through the use of a by-pass engine, an auxiliary air stream that is unheated is provided within the air duct external to the heated jet stream supplied by the engine.

A feature of the aircraft according to this invention is an arrangement of the air duct with respect to the fuselage for reducing loss due to skin friction. The velocity profile of a conventional wing or air foil is shown in Figure 5. The initial velocity of the wing relative to the surrounding air is $v_0$ and the velocity of the decelerated mass of air in the wake is $v_1$. Obviously, the losses increase with greater differences in $v_0$ and $v_1$.

When an air propulsive system is arranged according to Figure 6 for accelerating the boundary layer of air, loss of energy due to drag is greatly reduced. The boundary layer of air along the outer surface of the air duct is accelerated by being mixed with the exhaust stream. The increased efficiency that can be obtained by applying power to accelerate the boundary layer of air about a body that is in forward motion may be appreciated by considering the following mathematical analysis. When the velocity of the body relative to the surrounding air is $v_0$ and the velocity of the decelerated mass of air near the body is $v_1$, the drag D caused by the loss of momentum of the boundary layer of air is $$D = m_s(v_0 - v_1)$$

where $m_s$ is the decelerated mass of air per unit of time. The power required to overcome this drag is $$P_e = D \cdot v_0$$

By substituting for D from the previous equation, this equation becomes $$P_e = m_s v_0 (v_0 - v_1)$$

When a propulsive system is arranged so that the decelerated air along the body flows into the intake of the system, the air at the input of the system has the velocity $v_1$. The drag resulting from the reduced velocity of this air is eliminated by increasing the velocity of the air to the initial velocity $v_0$. The power required for accelerating the boundary layer of air is equal to the increase of kinetic energy per unit of time. The power $P_i$ to restore the velocity of the boundary mass of air to $v_0$ is $$P_i = \frac{m_s}{2}(v_0^2 - v_1^2)$$

The ratio of the power that is required for a system that accelerates the boundary layer of air to the power that is required to overcome the drag by an external system that does not accelerate the boundary layer of air is $$\frac{P_i}{P_e} = \frac{\frac{m_s}{2}(v_0^2 - v_1^2)}{m_s v_0 (v_0 - v_1)}$$

$$\frac{P_i}{P_e} = \frac{v_0 + v_1}{2v_0} = \frac{1 + v_1/v_0}{2}$$

Since $v_1$ is always smaller than $v_0$, the ratio of the power required when the wake is accelerated to the power that is otherwise required is smaller than 1. This analysis shows that the propulsive system arranged according to the aircraft of this invention results in greater efficiency than can be obtained by the arrangement in previous conventional aircraft.

A decelerated layer of air about the fore part of the fuselage ahead of the air duct will cause considerable drag, but a large degree of compensation for this loss is derived by utilizing the wake to improve the efficiency of the propulsive system. The wake is directed into the intake of the air duct for obtaining the increased efficiency.

Figure 9:
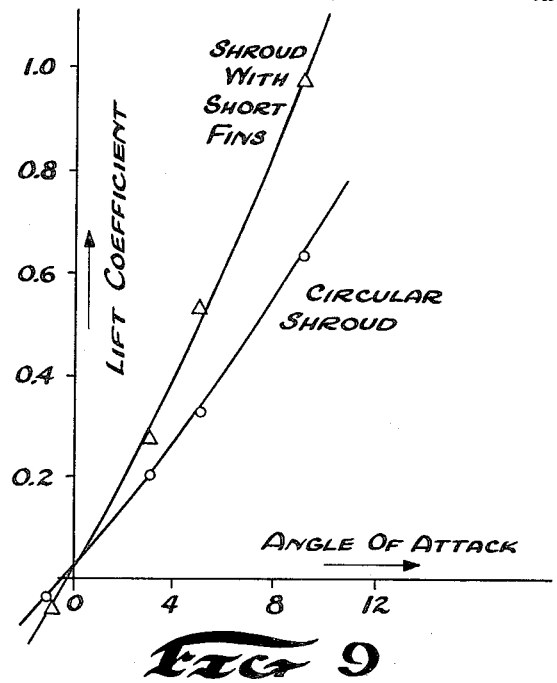
Figure 9 is a graph that compares the lift coefficients for circular shrouds and for shrouds with short fins.

Main lift for the aircraft of this invention is provided by upward circulation of air about the sides of the air duct. If the air duct is circular in cross-section as shown in Figure 7, the maximum possible lift is not obtained because the direct flow of air from the lower portion to the upper portion of the air duct decreases the suction on the upper side. In Figure 9, the curve that is identified by circular plotted points shows lift coefficient versus angle-of-attack for a shroud of circular cross-section. The angle-of-attack is the angle measured between the direction of the longitudinal axis of the air duct and the direction of air flow. The lift of the air duct is increased substantially by providing longitudinal ridges or stubby fins along the sides thereof. Figure 8 shows the upward flow of air about an air duct that has longitudinal side fins. The fins produce oppositely rotating vortices that greatly reduce the flow of air upward along the outer surfaces to the upper portion of the air duct. The greater lift that is obtained by the application of the side ridges is shown in Figure 9 by the curve that is identified by triangular plotted points.

Figure 10:
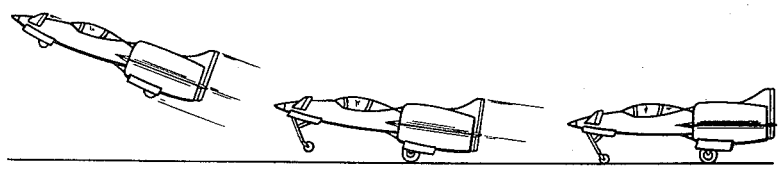
Figure 10 is a diagram to show various attitudes during take-off of an aircraft of this invention.

Aircraft constructed according to this invention and having prevalent power loading can take off on a short runway because of its high efficiency. When sufficient forward speed has been attained during take-off to raise the nose of the aircraft by lift from the fore and aft elevators, the rearward propulsive stream is directed downwardly for greatly increasing the lift that is applied to the aircraft. The typical pattern for take-off is illustrated in Figure 10. Immediately after take-off, the landing gear may be retracted and the high lift provided by the downwardly directed propulsive stream can provide nearly vertical ascent. This aircraft responds to the operation of control surfaces very much like a conventional wing aircraft. After the desired altitude has been obtained, the fore and aft elevators are adjusted to provide horizontal flight. In flight, the shroud produces lift by flow of air around the shroud, the flow of air being caused by a small angle-of-attack between the axis of the shroud and the direction of motion. Through individual control of the fore elevators, the rudder, and the aft elevators, turning of the aircraft is accomplished in a conventional manner. When the aircraft utilizes a jet engine in combination with a shock ring that encircles the fuselage ahead of the air duct intake, the shock ring is moved progressively forward as the speed increases above Mach 1. Landing is accomplished by reducing power while a large angle-of-attack is maintained until the rear wheels of the landing gear touch the selected runway. The downwardly directed propulsive stream provides lift so that landing can be accomplished on a short runway.

Although this invention has been described with respect to particular embodiments thereof, it is not to be so limited as changes and modifications may be made therein which are within the full intended scope of the invention as defined by the appended claims.

What is claimed is:

1. An aircraft having an elongated streamlined fuselage with a forward nose and a rear portion, a fore elevator with a substantial transverse dihedral angle mounted on each side of said nose, a substantially cylindrical air duct mounted coaxially about said rear portion, said air duct having upper and lower air foil portions that provide lift in response to a rearward flow of air over the surfaces of said air duct, a stubby fin extending outwardly from and extending longitudinally and contiguously along the outer surface of each side of said air duct, said fins substantially increasing lift by producing rotating vortices in response to an upward flow of air, each of said elevators having an adjustable air foil portion for providing both horizontal and vertical attitude control, and means mounted within said air duct for propelling air rearwardly over the exterior surface of said fuselage and through said air duct.

2. An aircraft having an elongated streamlined fuselage with a fore nose and a rear portion, a fore elevator with a substantial transverse dihedral angle mounted on each side of said nose, a substantially cylindrical air duct mounted coaxially about said rear portion, said air duct having upper and lower air foil portions that provide lift in response to a rearward flow of air over the surface of said air duct, each of said elevators having an adjustable air foil portion for providing both pitch control and roll stabilization, and means mounted within said air duct for propelling air rearwardly over the external surface of said fuselage and through said air duct.

References Cited in the file of this patent

UNITED STATES PATENTS

| | | |
|---|---|---|
| 1,990,308 | Phillips | Feb. 5, 1935 |
| 2,430,793 | Wells | Nov. 11, 1947 |
| 2,573,834 | Davidson | Nov. 6, 1951 |

FOREIGN PATENTS

| | | |
|---|---|---|
| 522,266 | Canada | Mar. 6, 1956 |
| 527,350 | Canada | July 3, 1956 |